United States Patent [19]

Seaver

[11] 4,246,390
[45] Jan. 20, 1981

[54] MOLDING POWDER OF ULTRA-HIGH MOLECULAR WEIGHT POLYETHYLENE AND PROCESS FOR ITS PREPARATION

[75] Inventor: Alton L. Seaver, Leominster, Mass.

[73] Assignee: American Hoechst Corporation, Somerville, N.J.

[21] Appl. No.: 142,543

[22] Filed: Apr. 21, 1980

Related U.S. Application Data

[63] Continuation of Ser. No. 973,412, Dec. 26, 1978, abandoned.

[51] Int. Cl.³ .................... C08F 6/00; C08F 110/02
[52] U.S. Cl. ........................ 526/352; 260/33.6 PQ; 264/331; 428/339; 528/481; 528/503
[58] Field of Search ............... 526/352; 528/481, 503

[56] References Cited

U.S. PATENT DOCUMENTS 3,412,080  11/1968  Smith et al. ..................... 260/94.9
3,847,888  11/1974  Baumgartner .................. 260/94.9 GD

FOREIGN PATENT DOCUMENTS 1448429  9/1976  United Kingdom .

OTHER PUBLICATIONS

"Design and Fabrication Guide," Polymer Dept., Hercules, Inc., Wilmington, Del. (Undated).
"Encyc. of Pol. Sci. and Tech.," 6, pp. 332-336 (1967).

Primary Examiner—Stanford M. Levin
Attorney, Agent, or Firm—Tatsuya Ikeda

[57] ABSTRACT

Ultra-high molecular weight polyethylene powder is heated at a temperature between its crystalline melting point and about 275° C. for a short period of time ranging from about one minute to about thirty minutes to obtain a molding powder having properties which facilitate the subsequent step of compression molding. Compression molded pieces made from heat-treated powder have better transparency, gloss and low-temperature mechanical properties than those made from untreated powder.

15 Claims, 10 Drawing Figures

MOLDING POWDER OF ULTRA-HIGH MOLECULAR WEIGHT POLYETHYLENE AND PROCESS FOR ITS PREPARATION

CROSS-REFERENCE TO RELATED APPLICATION

This application is a continuation of application Ser. No. 973,412 filed Dec. 26, 1978, now abandoned.

SUMMARY OF THE INVENTION

This invention relates to thermal treatment of ultra-high molecular weight polyethylene and to the novel polyehtylene compositions thus formed. More particularly, it relates to a method of treating powders of ultra-high molecular weight polyethylene, i.e., polyethylene having molecular weight of above about one million, at elevated temperatures above its crystalline melting point for a short period of time. This process affords polyethylene powders having improved properties which facilitate compression molding. Molded pieces made from heat-treated powder have better properties with respect to transparency, surface gloss and low-temperature mechanical properties.

BRIEF DESCRIPTION OF THE FIGURES

FIGS. 2: SEM picture of the same material as FIG. 1 after heat treatment at 250° C. for two minutes.

FIG. 3: SEM picture of the same material as FIG. 1 after heat treatment at 160° C. for twelve minutes.

FIG. 4: SEM picture of the same material as FIG. 1 after heat treatment at 120° C. for sixteen hours.

FIG. 5: SEM picture of a commercial ultra-high molecular weight polyethylene powder marketed by Hercules Incorporated under the trademark ®HIFAX 1900, before heat treatment. This material had a molecular weight of about $7 \times 10^6$, and more than 99% of the powder passed 60 mesh screen.

FIG. 6: SEM picture of the same material as FIG. 5 after heat treatment at 250° C. for two minutes.

Figure 5:
Figure 6:
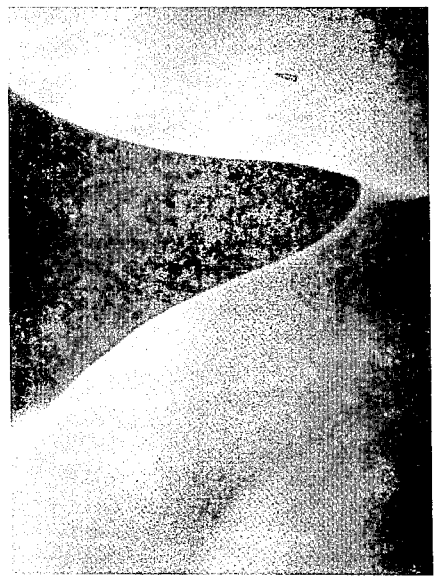
Figure 7:
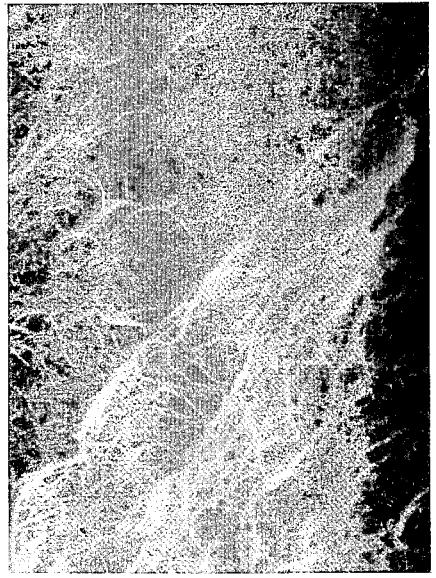
FIG. 7: SEM picture of the freeze-fractured surface of a sheet molded from untreated ®HOSTALEN GUR 413 powder.
Figure 8:
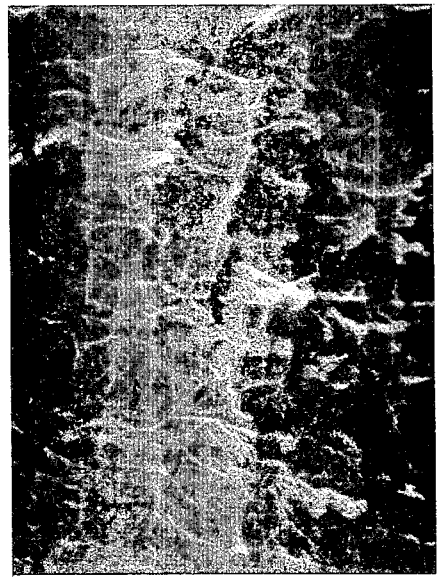
FIG. 8: SEM picture of the freeze-fractured surface of a sheet molded from the same material as FIG. 7 after heat treatment at 250° C. for two minutes.

The scales inside the FIGS. 1-6 correspond to $2\mu$, and those of FIGS. 7-8 correspond to $1\mu$.

DETAILED DESCRIPTION OF THE INVENTION

Although ultra-high molecular weight polyethylene (UHMW-PE) possesses various outstanding properties such as very high energy absorption characteristics, it presents certain melt processing problems, which has hampered the broadening of its application. The process of the present invention has unexpectedly been found to produce UHMW-PE having improved properties.

Figure 1:
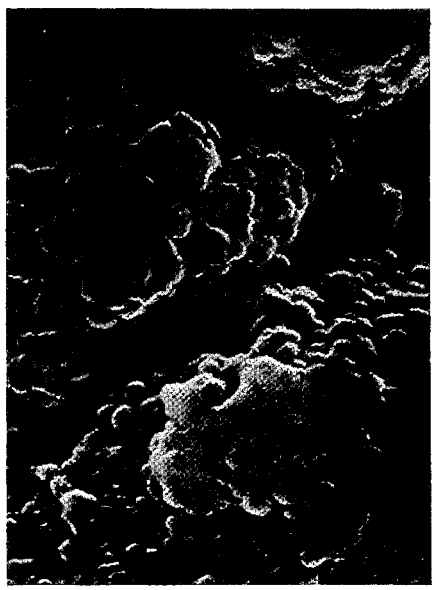
FIG. 1: Scanning electron microscope (SEM) picture ($\times 5,000$) of a commercial ultra-high molecular weight polyethylene powder marketed by American Hoechst Corporation under the trademark ®HOSTALEN GUR 413, before heat treatment. This material had a molecular weight of about $5 \times 10^6$, and more than 99 percent of the powder passed 60 mesh screen. The surface area as measured by B.E.T. method using nitrogen was 0.45 m²/g.

Typically such powders are used for making various articles by compression molding. Presently available ultra-high molecular weight polyethylenes are generally fine powders, the predominant portion of which comprises particles smaller than 1 mm size. Observation of these particles with a microscope even at a moderate magnification of 400, shows that the particles are not round and smooth, but have complex and irregular shapes. Use of scanning electron microscope at $\times 5000$ magnification is a convenient method for observing detailed structure of the powder surface. FIG. 1, for instance, shows that the single particle of ®HOSTALEN GUR 413 before heat treatment has a very complex irregular surface structure comprising nodules or spherules of about $1\mu$ or less, crevices and fibrous structures. We will refer to these details of the powder surface as observed by SEM at $\times 5000$ as "fine structure." FIG. 5 shows that ®HIFAX 1900 has less detailed surface structure than ®HOSTALEN GUR 413 but still has a substantial extent of fine structure in comparison to the powders heat-treated by the method of this invention as exemplified by FIGS. 2 and 6.

The ultra-high molecular weight polyethylene powders which are advantageously treated by the process of the present invention are characterized by a complex, irregular surface appearance when observed under SEM at $\times 5000$ or by the "fine structure" referred to above and by a molecular weight of above about $1 \times 10^6$, preferably between about $1 \times 10^6$ and about $12 \times 10^6$. Particular polyethylenes which have been found useful in this invention have molecular weight in the range of about $5 \times 10^6$–$7 \times 10^6$ as well as the irregular surface appearance or "fine structure" of the type described above.

Examples of specific ultra-high molecular weight polyethylenes of the type described above useful in this invention are ®HOSTALEN GUR (molecular weight is about 5 million and the compression molded sheets have the following typical physical properties; density 0.94, tensile strength 3,100 psi, ultimate tensile strength 6,300 psi and Shore-hardness D 64–67), and ®HIFAX 1900 (molecular weight is about 7 million and the compression molded sheets have the following physical properties; density 0.94 tensile strength 3,400 psi, ultimate tensile strength 6,300 psi and Shore—hardness D 67). Two samples of ®HOSTALEN GUR, namely, GUR 413 and 403 were used in the examples given below. More than 99% of the powder passed 60 mesh screen in either sample.

I have discovered that heat treatment of the UHMW-PE particles of the type described above for a short period of time at a temperature between the crystalline melting point and about 275° C. results in powders having properties which facilitate the compression molding of these powders and which form compression molded articles having improved properties such as high transparency, high surface gloss and low freeze-fracture temperature.

With respect to molding conditions, it has been found that, in order to obtain the same level of product quality with respect to transparency and surface gloss, pre-heat treated material of this invention requires less strenuous molding conditions such as time, temperature and pressure than the untreated material, and when compared at a given molding condition the heat treated material generally gives better transparency and gloss than the untreated material. Thus in many instances more economical molding can be achieved by the process of this invention.

Below the crystalline melting point, even prolonged heating does not cause any appreciable improvements in the particles with respect to these properties. There is no practical advantage in using higher temperatures than about 275° C. because of the risk of chemical changes of the particles such as oxidation, degradation, etc., and increased cost. The suitable length of time for the heat treatment naturally depends upon the temperature but typically it is a few minutes at 250° C. and more than thirty minutes at 140° C. The particular temperature-time combination necessary to effectuate the advantages of this invention depends to some extent, on the particle size of the resin and effectiveness of heat-transfer in the heating device employed. Typical time-temperature condition useful in this invention is about 140° to 270° C. for about one to thirty minutes. Preferred time-temperature condition useful in this invention is about 160° to 250° C. for about 2 to 16 minutes.

Figure 2:
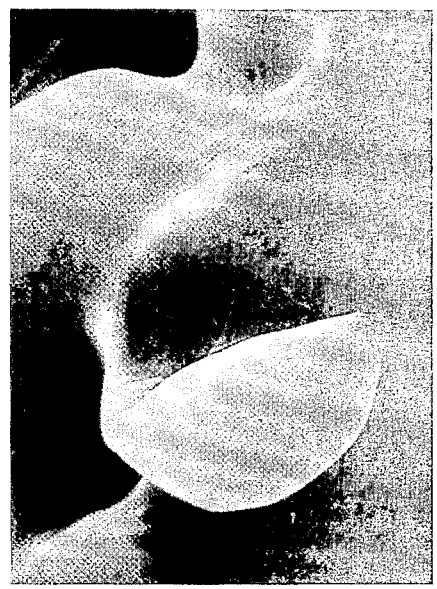
FIGS. 2-6 were also obtained at the $\times 5,000$ magnification whereas FIGS. 7 and 8 were obtained at $\times 10,000$.

In a preferred embodiment of the process of the present invention it has been found desirable to heat treat the UHMW-PE powders useful in this invention at a temperature between about the crystalline melting point of the polyethylene powder and about 275° C. for a period of time effective to substantially destory the "fine structure" of the particles as observed by SEM at ×5000. FIGS. 2 and 6 exemplify powders in which the fine structure has substantially been destroyed. As will be noted from FIGS. 2 and 6, the powders thus treated have a smooth, regular surface appearance when viewed by SEM at ×5000. There is no practical advantage in continuing the heating more than is necessary to effectuate the substantial destruction of fine structures, and particularly when the temperature is relatively high within this range, prolonged heating will lead to the yellowing of the molded product. Typical time temperature conditions useful to achieve the substantial destruction of "fine structures" are about 140° to 270° C. for about one to about thirty minutes, preferably about 160°-250° C. for about two to sixteen minutes.

Specific UHMW-PE powders were treated in accordance with the process of this invention to achieve substantial destruction of "fine structures" under the following conditions; ®HOSTALEN GUR 413 powder was treated at about 250° C. for about three minutes in order to achieve substantial descruction of fine structure. ®HOSTALEN GUR 403 powder was treated at about 250° C. for about three minutes in order to achieve substantial destruction of fine structure. ®HIFAX 1900 was treated at about 250° C. for about three minutes to achieve substantial destruction of "fine structure."

Under the temperature-time conditions of this invention, the heat treatment does not require inert atmosphere such as nitrogen, but can be done in air without accompanying any appreciable oxidation or degradation of the material. Although a conventional oven is conveniently employed in the process of this invention, the particular device or mechanism of heat-transfer used is not critical, and other known methods of heating powders may be used. For instance, the resin powder may be placed in a column as a fluidized bed and hot gas such as air or nitrogen may be blown through the column, although the optimum temperature-time condition found for this device may be somewhat different from the one found for the oven-heating.

Another aspect of the present invention is the novel UHMW-PE compositions having improved molding properties, which novel compositions are prepared by the process of the instant invention.

Such novel UHMW-PE powder composition of this invention has a molecular weight of above about $1 \times 10^6$ as measured by the method described hereinafter, and a substantially smooth surface appearance free of fine structures such as nodules of less than about one micron in size, crevices and fibrous structures, as viewed under scanning electron microscope at 5000 magnification.

As compared to conventional polyethylene molding powders, the ultra-high molecular weight polyethylene powders subjected to the process of the present invention gives molded products with better properties, particularly with respect to the transparency, gloss and low-temperature mechanical properties such as brittle temperature.

A typical commercial use of the improved powders of this invention is the manufacture of compression-molded sheets of various sizes and thickness which in turn are used for a wide variety of end applications such as linings for chutes.

Molecular weights of the materials used here were determined from the viscosity measurements of decalin solutions at 135° C. by the formula.

Molecular weight $= 5.37 \times 10^4$ (intrinsic viscosity)$^{1.49}$.

The term crystalline melting point as used here is determined by placing the powder sample in *Mettler Hot Stage FP*-5 equipped with a polarized microscope and by detecting the loss of birefringence through the use of polarized light while the temperature is continuously raised at the rate of 10° C./min. A typical value of the crystalline melting point of commercial ultra-high molecular weight polyethylene is 140° C. as measured by this technique, but there are some variations among the individual commercial materials.

Following examples are given for illustrative purposes and should not be construed as a limitation on the invention.

EXAMPLE 1

A powder sample of a commercial ultra-high molecular weight polyethylene, ®HOSTALEN GUR 403 (molecular weight was $5 \times 10^6$ and more than 99% of the powder passed 60 mesh screen) was placed in a porcelainized metal pan as a layer of ¼ inch thickness and the pan was introduced to an oven maintained at 250° C. After three minutes of heating the pan was taken out. In view of the time necessary for the oven to return to the original temperature and the initial warm-up period of the particles, this condition was effectively two minutes at 250° C. (This "effective time" was ascertained by comparing the extent of change of the fine structure caused by the heating in this oven with the one caused by the heating in Mettler Hot Stage which had very little time lag of heat transfer, the temperature being the same in both cases). A similar heating experiment was carried out using the same apparatus and material except the heating condition was 250° C. for five minutes (the effective condition was 250° C. for four minutes). In both experiments, when the powder cooled, a skin was covering most of the surface. The materials were crushed by hand and passed through a 20 mesh screen prior to molding. Comparison between FIG. 1 and FIG. 2 exemplifies a typical difference of morphology of the ®HOSTALEN GUR particles before and after the heat treatment at 250° C. for two minutes. (These two figures were obtained on a ®HOSTALEN GUR 413 sample. See Example 3 below for a more detailed explanation).

A prosthetic cup of about one inch radius hemisphere having 3/16 to ¼ inch wall thickness was compression molded from each (a) untreated ®HOSTALEN GUR 403, (b) ®HOSTALEN GUR 403 pre-heat treated at 250° C. for three minutes, and (c) ®HOSTALEN GUR 403 pre-heat treated at 250° C. for five minutes. These three samples were designated Sample A, B and C respectively. The processing cycle in all three cases was the following:

1. The resin powder was placed in the mold and pressed at 32,640 psi for seven minutes.
2. The temperature was brought up to 400° F. and the pressure reduced to 4,080 psi. These conditions were maintained for 25 minutes.
3. While maintaining the temperature at 400° F., the pressure was raised to 20,400 psi and kept there for five minutes.
4. While maintaining the pressure at 20,400 psi, the material was gradually cooled to 25° C. in about thirty minutes.

Comparison among the Samples A, B and C led to the following conclusions: Samples B and C processed more easily than Sample A; Sample B gave a clearer, glossier and smoother finished product than Sample A; and Sample C had a yellow color indicating an excessive pre-heat treatment.

The ®HOSTALEN GUR 403 sample used here had a crystalline melting point of 139.5° C. as measured by the aforementioned technique. There was no substantial change in the crystalline melting point of the sample after the heat treatment.

EXAMPLE 2

An untreated powder sample of ®HOSTALEN GUR 413 and one heat-treated at 250° C. for two minutes (effective time) were used to compression mold plaques of 12 inch × 12 inch × 1.5 mm size at the following conditions, (a) heat at 390° F. (199° C.) for 60 minutes at 2 tons of force and (b) cool down to room temperature in 30 minutes at 60 tons of force.

Transparencies of the molded sheets were measured in terms of the thickness of the layers of the sheet through which one can read black letters of 4.5 mm × 4.5 mm size printed on a white paper. In the case of the sheet molded from the untreated powder, the letters were legible through 3.0 mm thickness but not through 4.5 mm thickness, whereas in the case of the sheet molded from heat-treated powder, the letters were legible through 4.5 mm thickness but not through 6.0 mm thickness, indicating a higher transparency for the latter sheet.

Figure 9:
FIG. 9: Nomarski interference photograph (for procedure, see "Polarizing Microscope" 3rd edition, A. F. Halland, published by Vickers Intruments, York, England, 1970) of the surface of a plaque compression molded from ®HOSTALEN GUR 413 untreated powder. Magnification was at $\times 200$.
Figure 10:
FIG. 10: Nomarski interference photograph ($\times 200$) of the surface of a plaque compression-molded from ®HOSTALEN GUR 413 powder heat-treated at 250° C. for two minutes.

Surface gloss of the two sheets mentioned above was measured by using an ABS plaque as a reference standard. By using a Nomarski Interference Contrast System the surface to be examined was put in focus and the intensity of light reflected from the surface was measured on a Vickers J-35 camera system. A "Gardner Gloss Meter" was adjusted at 100 when the subject was the ABS plaque. The readings of the reflected light intensities were 40–45 for the sheet made from the untreated powder and 75–80 for the sheet made from the heat-treated powder. Normalski interference pictures of the surfaces of the two sheets were taken at ×200 magnification and they are shown at FIG. 9 (untreated) and FIG. 10 (heat-treated). It is noticed that the sheet molded from the heat-treated material has a smoother surface than the one from the untreated material when they are examined under this condition, explaining the difference in the gloss as measured by the above technique.

EXAMPLE 3

The crystalline melting point of a ®HOSTALEN GUR 413 sample was measured by the procedure described earlier, and it gave 141.4° C. After a heat treatment at 250° C. for two minutes, the crystalline melting point was substantially the same as before.

The surface area measurement of the untreated and the heat-treated powder sample by the B.E.T. (Brunauer-Emmett-Teller) method using nitrogen gave 0.45 m$^2$/g and 0.38 m$^2$/g, respectively.

EXAMPLE 4

A comparative experiment similar to Example 1 was carried out using a powder sample of another commercial ultra-high molecular weight polyethylene, ®HIFAX 1900 (molecular weight is $7 \times 10^6$). Untreated material (Sample D), material treated at 250° C. for three minutes (Sample E), and material treated at 250° C. for five minutes (Sample F) were subjected to the same molding cycle as described in Example 1 to form the prosthetic cups described above.

Comparison among the molding runs based on Samples D, E and F led to the same conclusion as recited in Example 1, namely that the molded piece made from the material pre-heat treated at 250° C. for two minutes had a better transparency, gloss and smoothness than the one made from the untreated material, that the heat treatment at 250° C. for three to five minutes facilitated the compression molding and that some yellowing of the material resulted from the treatment at 250° C. for five minutes.

EXAMPLE 5

Figure 3:
Figure 4:

A commercial ultra-high molecular weight polyethylene powder, ®HOSTALEN GUR 413, was studied by scanning electron microscopy both before heat treatment and after heat treatment under varying conditions. FIG. 1 is before heat treatment and shows a complex structure of the particle. FIG. 2 is a picture of the same material after a heat treatment in an oven at 250° C. for two minutes showing a complete destruction of the fine structures resulting in the particle having a much smoother surface than before. FIG. 3 is a picture of the same material after a heat treatment in the oven at 160° C. for twelve minutes showing a substantial loss of the fine structures. FIG. 4 corresponds to a heat treatment at 120° C. for 16 hours showing that at 120° C. even an extended period of heating (16 hours) does not cause any appreciable change of morphology of the particle.

The molecular weight of the material before heat treatment was $5.2 \times 10^6$, whereas it was $5.3 \times 10^6$ after the heat treatment at 250° C. for two minutes, indicating that there was little chemical change of the material under this condition of heat treatment.

EXAMPLE 6

A powder sample of ®HIFAX 1900 was studied in a similar manner as Example 5.

FIG. 5 is a SEM picture of the material before heat treatment. FIG. 6 is a SEM picture of the same material after a heat treatment at 250° C. for two minutes. Again, it is noticed that the heat treatment of 250° C. for two minutes causes a considerable change in the morphology of the particles; the fine structures of the surface of the particles are lost to a large extent and the particles become smoother.

EXAMPLE 7

A plaque of $12'' \times 12'' \times \frac{1}{4}''$ size was compression molded using ®HOSTALEN GUR 413 after it had been heat treated at 250° C. for two minutes (effective heating time). The molding condition was (a) heat at 390° F. (199° C.) for sixty minutes at two tons of force and (b) cool down to room temperature in thirty minutes at 60 tons of force. A test piece about three inches long, $\frac{1}{4}$ inch wide and $\frac{1}{4}$ inch thick was band-sawed out of this plaque. Another test piece of $2'' \times \frac{1}{4}'' \times \frac{1}{4}''$ size was carved out of a sheet which had been molded under the same condition as above from untreated ®HOSTALEN GUR 413 powder, and these two test pieces were compared with regard to the freeze fracture characteristics.

The two test pieces were placed in liquid nitrogen for a sufficient length of time for temperature equilibration and were snapped by hand instantly after they were taken out of the liquid nitrogen bath. In the case of untreated material, the sheet broke brittlely and the picture of the fractured surface, FIG. 7, showed a distinct morphology similar to the one possessed by the original untreated powder as shown in FIG. 1.

In the case of pre-treated material, however, it did not brittle fracture at liquid nitrogen temperature; it needed a notching in order to be broken. The scanning electron microscopic picture of the fractured surface, FIG. 8, shows that the characteristic morphology of the original untreated powder is absent, and that the fractured surface is completely different from characteristic morphology of brittle structure, indicating that a plastic flow has occurred.

I claim:

1. A process of heat treating a powder of ultra-high molecular weight polyethylene having a molecular weight of above about $1 \times 10^6$ as determined from its intrinsic viscosity in decalin solution at 135° C. by the formula, $MW = 5.37 \times 10^4 \text{ (intrinsic viscosity)}^{1.49}$ and a substantial amount of fine structures comprising nodules of less than about 1 micron size, crevices and fibrous structures as viewed under scanning electron microscope at $\times 5000$ magnification, said heat treating being conducted at a temperature in the range from about the crystalline melting point of said polyethylene but at least about 140° C. to about 275° C. for an effective period of time to produce a polyethylene powder which is substantially free of fine structures and which has a substantially smooth surface appearance when observed by SEM at $\times 5000$.

2. The process of claim 1 wherein the polyethylene powder is heated for a period of time effective to substantially destroy any fine structures as observed by SEM at $\times 5000$.

3. A process according to claim 1, wherein the powder is heat-treated for at least about one minute.

4. A process according to claim 1, wherein the powder is heat-treated for a period of time at least about two minutes but not more than about thirty minutes.

5. A process according to claim 1, wherein an ultra-high molecular weight polyethylene powder having a molecular weight of about $5 \times 10^6$ and a crystalline melting point of about 140° C., and more than about 99% of which is smaller than about 60 mesh screen, is heat-treated at about 200°-250° C. for about 2 to 10 minutes.

6. A process according to claim 1, wherein an ultra-high molecular weight polyethylene powder having a molecular weight of about $7 \times 10^6$ and a crystalline melting point of about 140° C., and more than about 98% of which is smaller than about 60 mesh screen, is heat-treated at about 200°-250° C. for about 2 to 10 minutes.

7. A process of heat treating a molding powder of ultra-high molecular weight polyethylene having a molecular weight of between about $5 \times 10^6$ and $7 \times 10^6$ and having a crystalline melting point of about 140° C., said heat-treatment being conducted at about 200°-250° C. for about two to ten minutes.

8. The process of claim 7 wherein the polyethylene has a molecular weight of about $5 \times 10^6$, wherein more than about 99% of said polyethylene is smaller than about 60 mesh screen and wherein the heat-treatment is conducted at about 250° C. for about two to five minutes.

9. The process of claim 8 wherein the heat treatment is conducted for about two minutes.

10. The process of claim 8 wherein the polyethylene has a molecular weight of about $7 \times 10^6$, wherein more than about 99% of said polyethylene is smaller than about 60 mesh screen, and wherein the heat treatment is conducted at about 250° C. for about two to five minutes.

11. The process of claim 10 wherein heat treatment is conducted for about two minutes.

12. A molding powder of ultra-high molecular weight polyethylene having a molecular weight of above about $1 \times 10^6$, a crystalline melting point of about 140° C., and a substantially smooth surface appearance free of fine structures comprising nodules of less than about 1 micron size, crevices and fibrous structures as viewed under scanning electron microscope at $\times 5000$ magnification.

13. A molding powder of ultra-high molecular weight polyethylene of claim 12, wherein the molecular weight is $1 \times 10^6 - 12 \times 10^6$.

14. A molding powder of claim 13 having a molecular weight of about $5 \times 10^6$.

15. A molding powder of claim 14 having a molecular weight of about $7 \times 10^6$.

* * * * *